(12) United States Patent
Miyai et al.

(10) Patent No.: US 6,588,675 B2
(45) Date of Patent: Jul. 8, 2003

(54) CONTROLLER UNIT OF AUTOMOTIVE AIR CONDITIONING APPARATUS

(75) Inventors: Daisuke Miyai, Aichi (JP); Satoshi Ogawa, Nagoya (JP); Yoshiyuki Aoki, Kasugai (JP); Takaki Mizuno, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 9 days.

(21) Appl. No.: 10/058,339

(22) Filed: Jan. 30, 2002

(65) Prior Publication Data

US 2002/0100811 A1 Aug. 1, 2002

(30) Foreign Application Priority Data

Jan. 31, 2001 (JP) ........................................ 2001-023718
Jan. 31, 2001 (JP) ........................................ 2001-023719

(51) Int. Cl.$^7$ ................................................ B60H 1/00
(52) U.S. Cl. ......................... 236/51; 62/244; 165/204
(58) Field of Search ............................. 236/51, 44 R, 236/44 A, 44 C; 62/151, 150, 176.1, 176.2, 244, 161, 163; 165/222, 230, 202, 204

(56) References Cited

U.S. PATENT DOCUMENTS

| | | | | |
|---|---|---|---|---|
| 4,709,751 A | * | 12/1987 | Ichimaru et al. | .......... 62/244 X |
| 5,156,204 A | * | 10/1992 | Doi | ........................... 62/244 X |
| 6,118,099 A | * | 9/2000 | Lake et al. | ................ 62/244 X |
| 6,155,061 A | * | 12/2000 | Davis, Jr. et al. | ......... 236/44 C |

* cited by examiner

Primary Examiner—Harry B. Tanner
(74) Attorney, Agent, or Firm—Morgan, Lewis & Bockius LLP

(57) ABSTRACT

There are provided a first controller (100) which has an operation button and a button holder that are provided movably between different mode switching operation positions in order to switch and operate an outside air intake mode and an inside air circulating mode for circulating the inside air, and a second controller (200) having a first operation knob and a shaft that are provided in order to switch and operate plural air conditioning modes. A cable (K) is provided between the first controller and the second controller, which changes, when switching between the undefrosting mode and the defrosting mode by the first operation knob and the shaft is performed, a mode switching operation position of the operation button and button holder according to the above switching operation.

7 Claims, 15 Drawing Sheets

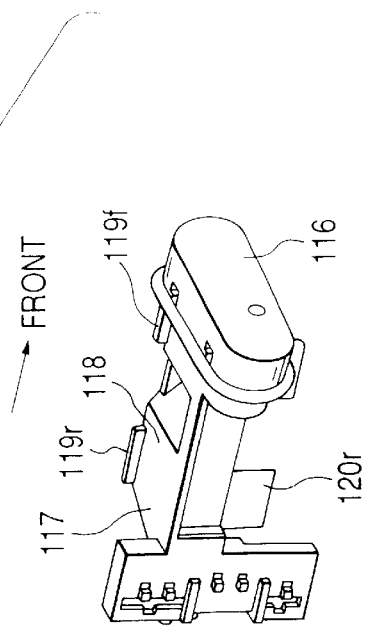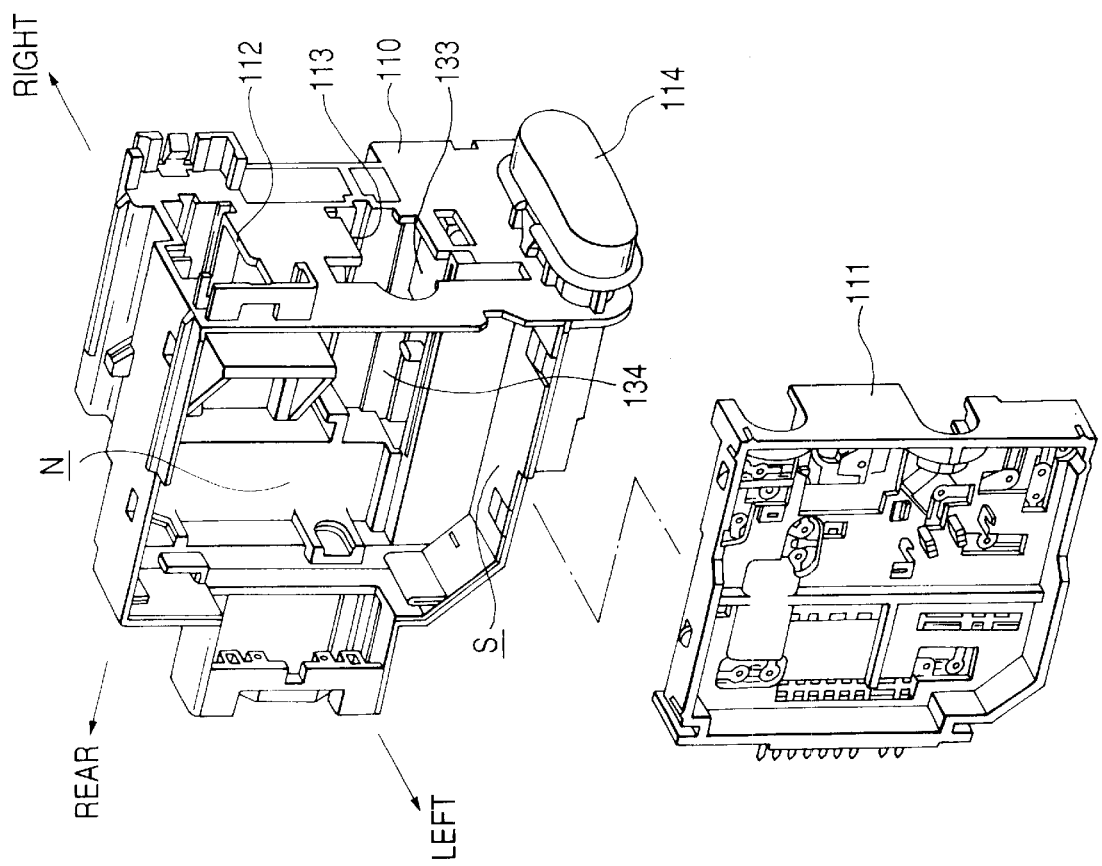
FIG. 10

FIG. 15A
FIG. 15B
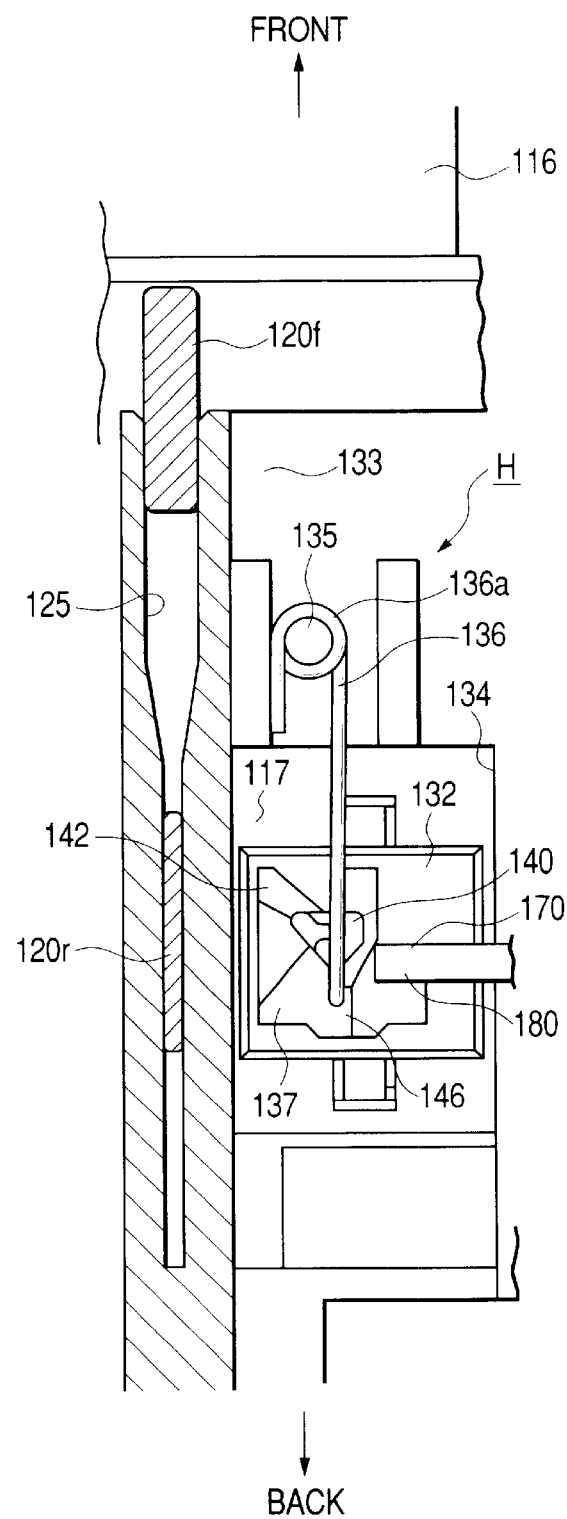
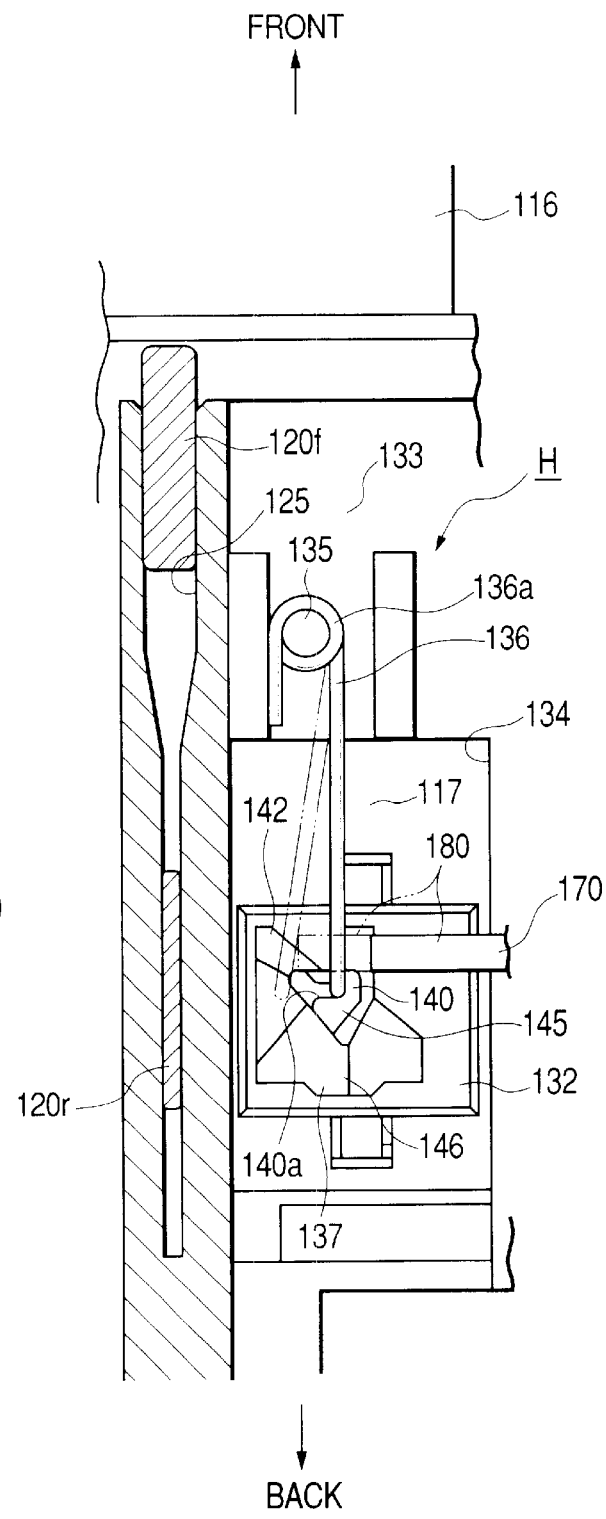

CONTROLLER UNIT OF AUTOMOTIVE AIR CONDITIONING APPARATUS

BACKGROUND OF THE INVENTION

The present invention relates to a controller unit of an automotive air conditioning apparatus that can perform switching of inside and outside air.

A related controller unit of an air conditioner used as an automotive air conditioning apparatus can select a cooling mode, a heating mode, a dehumidifying mode and a ventilating mode.

A passenger such as a driver operates various switches provided for this controller unit and selects the above-mentioned various control modes provided for this air conditioner, whereby he can obtain air condition of his desire.

In such the automotive air conditioning apparatus, in case that the air conditioning apparatus is set in a dehumidifying defrosting mode under the state of high humidity where fog is easy to be produced on a window glass, it is generally proposed that the mode is detected and a resistant value of a temperature setting resistor is changed thereby to make a cooling state by setting the lowest temperature and make operation of a compressor possible. An object of this apparatus is to realize a surely anti-fog function by giving a dehumidifying effect using an evaporator together with defrosting action by air flow, and this apparatus includes a mode detecting switch that sets the resistant value for setting a temperature in the defrosting mode to a value in which the operation of the compressor is possible.

When the defrosting mode is thus selected in the automotive air conditioning apparatus, it is desirable that a cooling compressor is driven and the air dehumidified by the evaporator is blown on the front glass. In this case, when the defrosting mode is selected, it is desirable that drive of the above compressor is automatically started.

Further, such an the automotive air conditioning apparatus is proposed in which an outside air intake mode that takes automotive outside air in an automobile and an inside air circulating mode that circulates inside air are generally set, the outside air intake mode is automatically selected when the defrosting mode is selected in order to perform the anti-fog control.

Generally, in the automotive air conditioning apparatus so constituted that the outside air intake mode is automatically selected when the defrosting mode is selected, a controller for selecting the defrosting mode and a controller for selecting the outside air intake mode or the inside air circulating mode are separately provided.

Therefore, in the related apparatus, a sensor switch for detecting selection of the defrosting mode is provided, and an actuator is operated on the basis of ON of this sensor switch thereby to switch from the inside air circulating mode to the outside air intake mode.

However, in case of this constitution, the sensor switch, the actuator, and electrical circuits for their drive are required, so that a problem of high-cost is caused.

SUMMARY OF THE INVENTION

An object of the invention is to provide, by a simple constitution, a controller unit of an automotive air conditioning apparatus that can switch from the inside air circulating mode to the outside air intake mode at the time of defrosting mode selection.

In order to solve the aforesaid object, the invention is characterized by having the following arrangement.

(1) A controller unit of an automotive air conditioning apparatus comprising:
   a first controller including a first switching operation unit provided movably between different mode switching operation positions to perform a switching operation between an intake mode for taking outside air in and an inside air circulating mode for circulating inside air;
   a second controller including a second switching operation unit for performing a switching operation among at least two different air conditioning modes that are different from the modes in the first controller; and
   a cable which is coupled between the first controller and the second controller, and changes, when the air conditioning mode of the second controller is switched to the predetermined mode by the second switching operation unit, the mode switching operation position of the first switching operation unit according to the switching operation by the second switching operation unit.

(2) The controller unit according to (1), wherein the cable, when the second switching operation unit switches the air conditioning mode to the predetermined mode, changes the position of the first switching operation unit from the mode switching operation position in the inside air circulating mode to a mode switching operation position in the outside air intake mode.

(3) The controller unit according to (1), wherein
   the second switching operation unit is provided movably between mode switching operation positions in a defrosting mode for performing anti-fog control and in a undefrosting mode for not performing anti-fog control, and
   the cable, when the second switching operation unit is operated from the mode switching operation position in the undefrosting mode to the mode switching operation position in the defrosting mode, changes the mode switching operation position of the first switching operation mode.

(4) The controller unit according to (2), wherein
   the second switching operation unit is provided movably between mode switching operation positions in a defrosting mode for performing anti-fog control and in a undefrosting mode for not performing anti-fog control, and
   the cable, when the second switching operation unit is operated from the mode switching operation position in the undefrosting mode to the mode switching operation position in the defrosting mode, changes the mode switching operation position of the first switching operation mode.

(5) A controller unit of an automotive air conditioning apparatus comprising:
   a first controller including a first switching operation unit provided movably between different mode switching operation positions to perform a switching operation between an intake mode for taking outside air in and an inside air circulating mode for circulating inside air;
   a second controller including a second switching operation unit for performing a switching operation among at least two different air conditioning modes that are different from the modes in the first controller;
   a cable which is coupled between the first controller and the second controller, and transmits, when the air conditioning mode is switched to the predetermined mode by the second switching operation unit in the second controller, the switching operation by the second switching operation unit to the first switching operation unit;

holding mechanism provided to the first switching operation unit, which can hold the mode switching operation position in the inside air circulating mode and can change the mode each time the operation is performed; and release mechanism provided to an end of the cable on the first switching operation unit side and to the first controller, which releases, when the first switching operation unit is held in the inside air circulating mode by the holding mechanism, the holding of the holding mechanism and changes the inside air circulating mode into the intake mode.

(6) The controller unit according to (5), wherein the holding mechanism includes:

a return spring for energizing the first switching operation unit to an original position;

a cam groove having an approximately V-shaped fitting portion, which is provided to one of the first switching operation unit and a base member in which the first switching operation unit is movably provided; and a lock member of which one end is attached to the other of the first switching operation unit and the base member, and a free end of the lock member is moved relatively along the cam groove according to movement of the first switching operation unit and fits to the fitting portion thereby to hold the mode switching operation position in the inside air circulating mode.

(7) The controller unit according to (6), wherein the release mechanism includes a lock releasing member that releases, when the free end of the lock member is fitted to the fitting portion, its fitting of the free end by the operation of the cable.

BRIEF DESCRIPTION OF THE DRAWINGS

FIG. 10 is an exploded perspective view of the first controller.

FIGS. 15A and 15B are main portion sectional views for description of action of the first controller.

DETAILED DESCRIPTION OF PREFERRED EMBODIMENTS

One embodiment in which the invention is embodied will be described below with reference to FIGS. 1 to 17.

Figure 1:
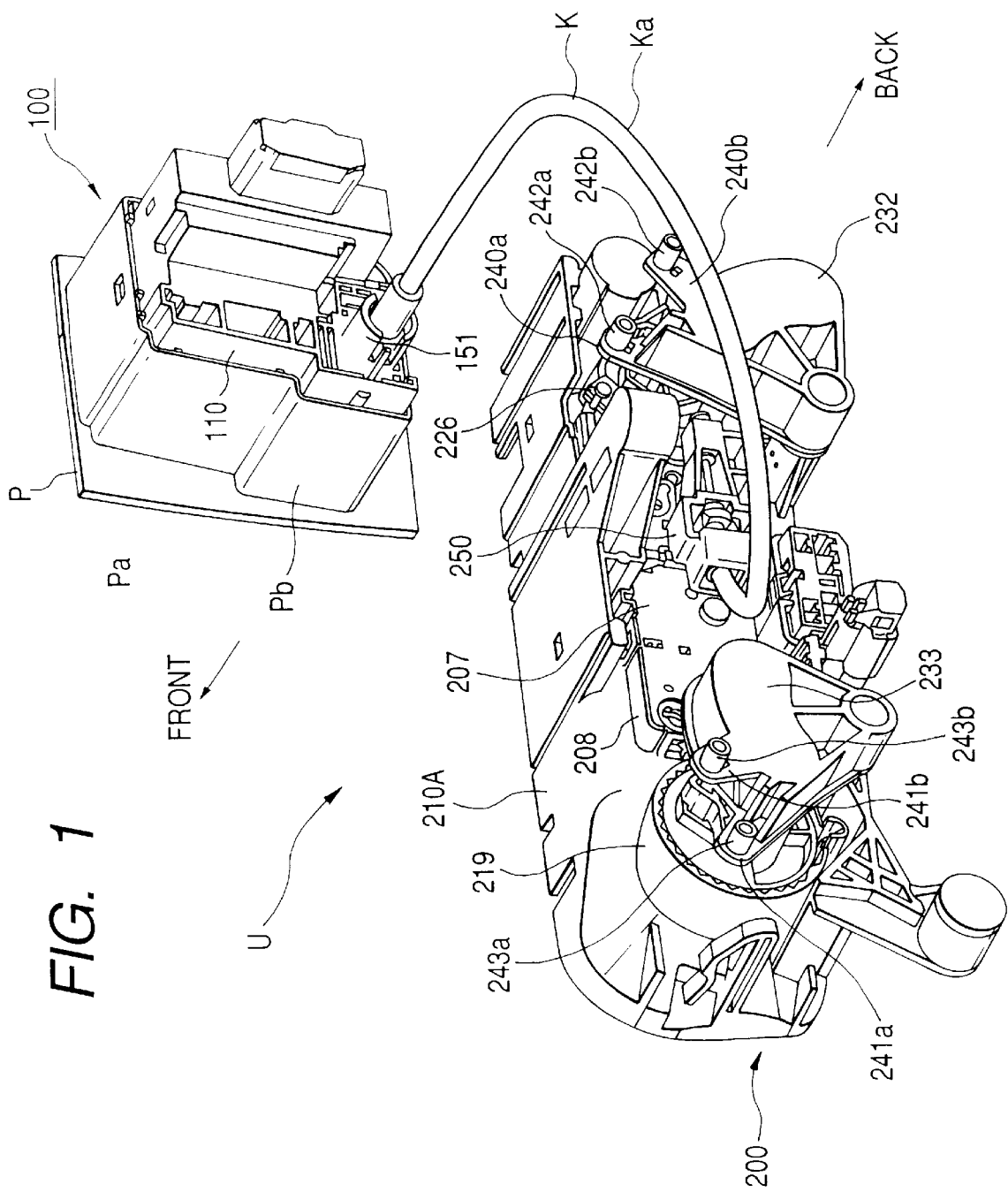
FIG. 1 is a schematic perspective view of the whole of a controller unit of an automotive air conditioning apparatus in one embodiment.
Figure 2:
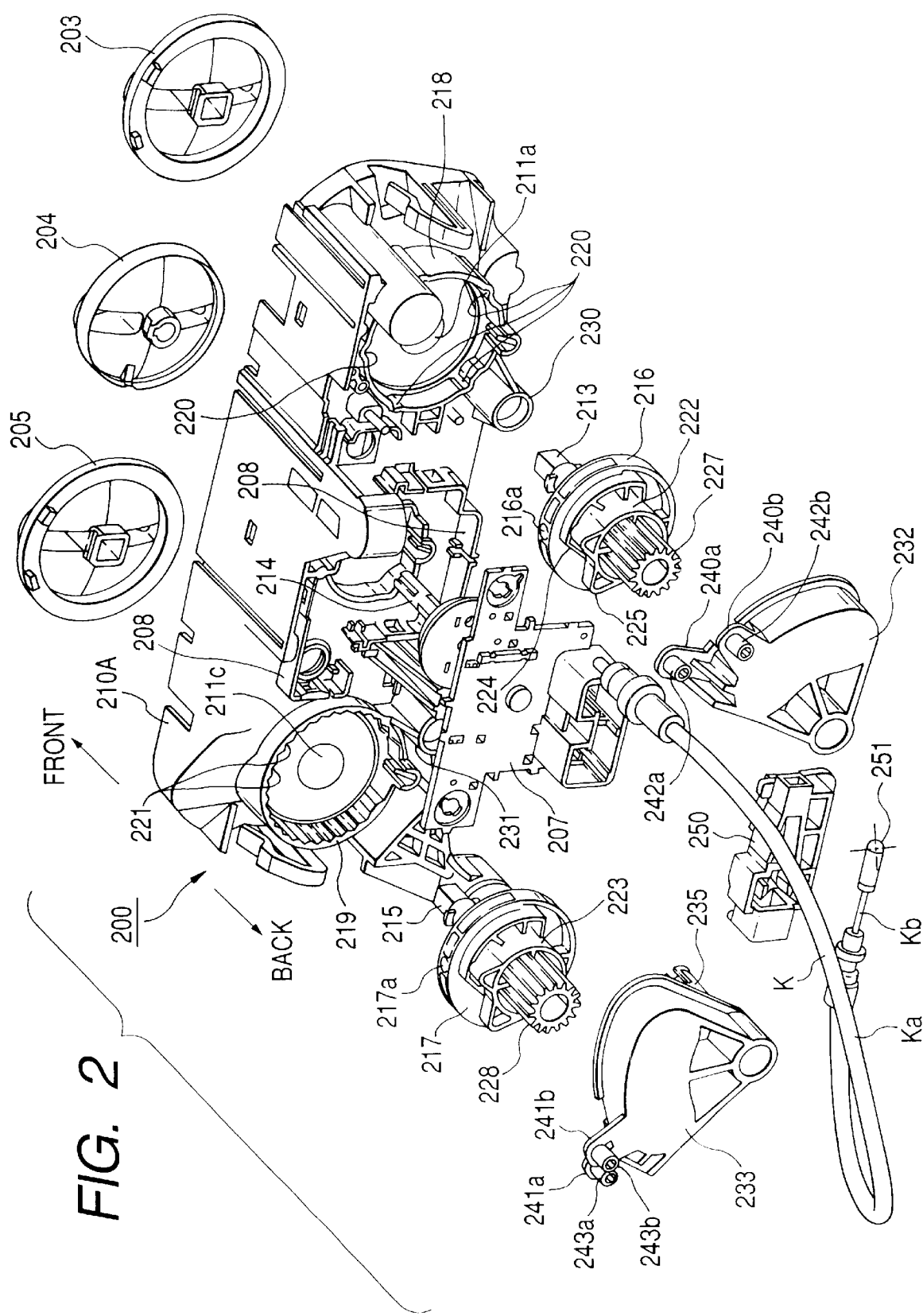
FIG. 2 is an exploded perspective view of a second controller.
Figure 3:
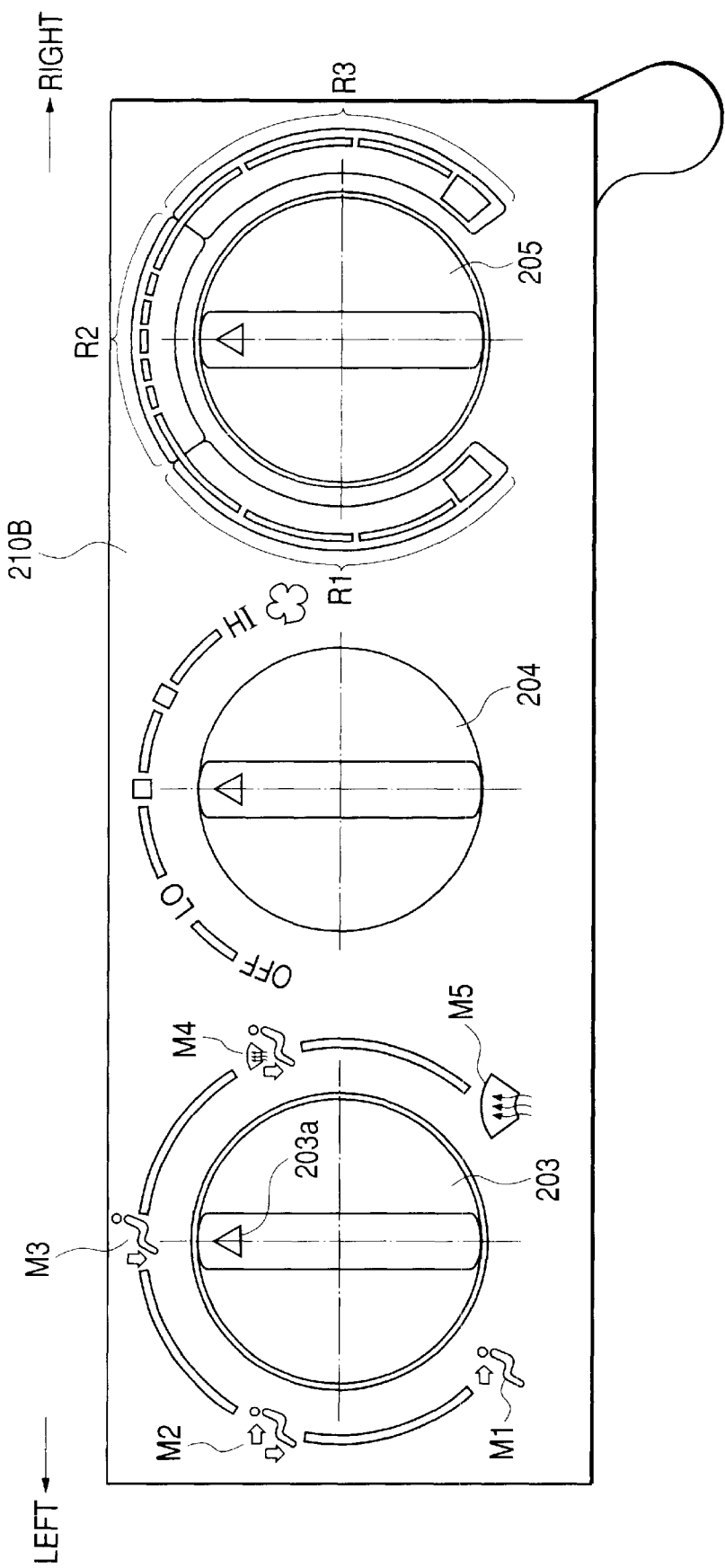
FIG. 3 is a front view of the second controller.
Figure 4:
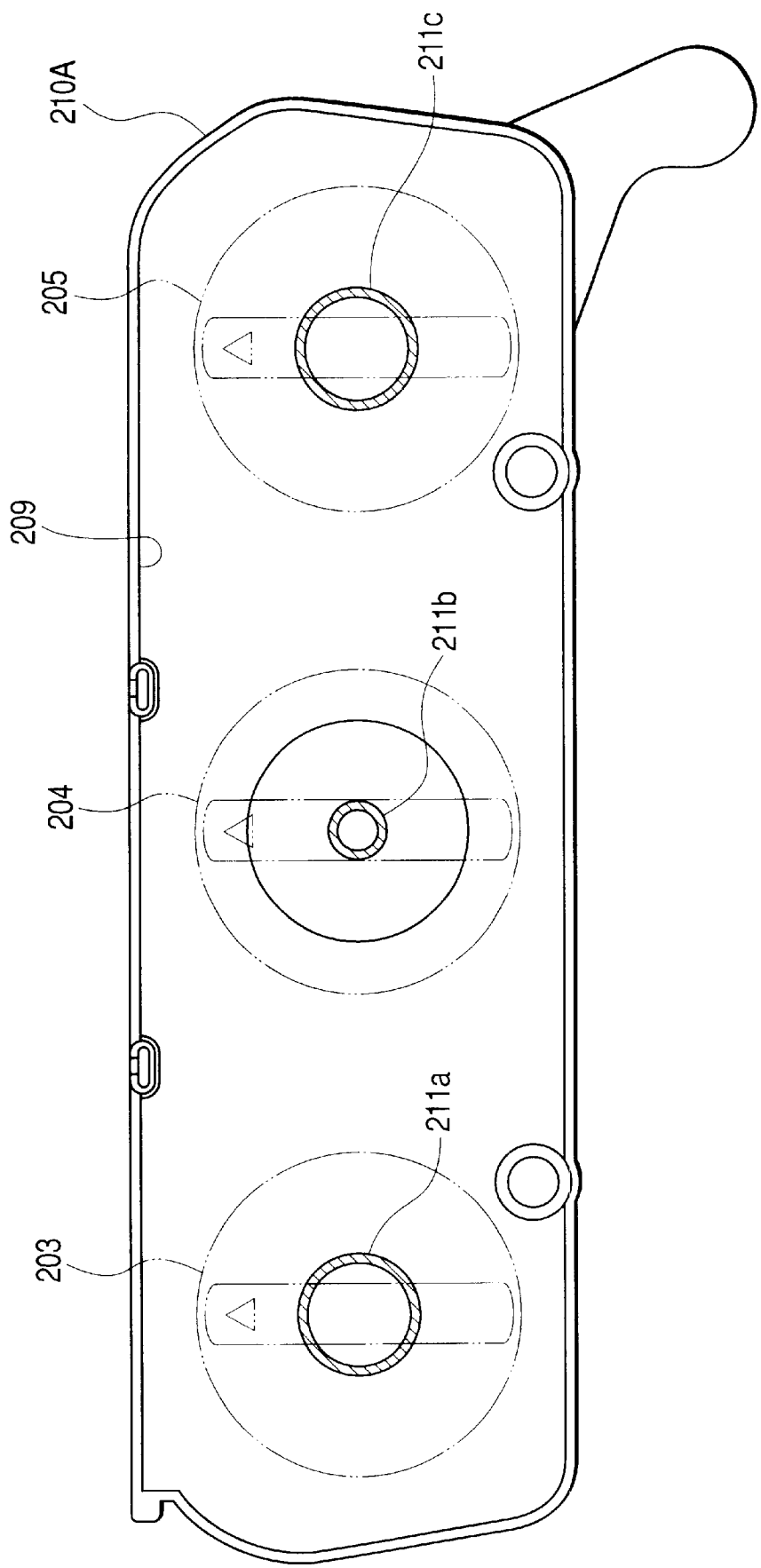
FIG. 4 is a front view of a case body of the second controller.

FIG. 1 is a schematic perspective view of the whole of a controller unit U of an automotive air conditioning apparatus, FIG. 2 is an exploded perspective view of a second controller, FIG. 3 is a front view of the second controller, and FIG. 4 is a front sectional view in which an operation panel of the second controller is omitted.

The controller unit U comprises a first controller 100, a second controller 200 and a cable K for mechanically coupling both controllers. The both controllers 100, 200 are mounted on an instrument panel (not shown).

Second controller 200

Firstly, the second controller 200 will be described.

In this embodiment, a direction on an operation surface side is referred to as the front, and a direction on an anti-operation surface side is referred to as the back (refer to FIGS. 1, 2 and 10). As shown in FIG. 3, a left direction as one faces the operation surface side is referred to as the left, and a right direction is referred to as the right.

Figure 5:
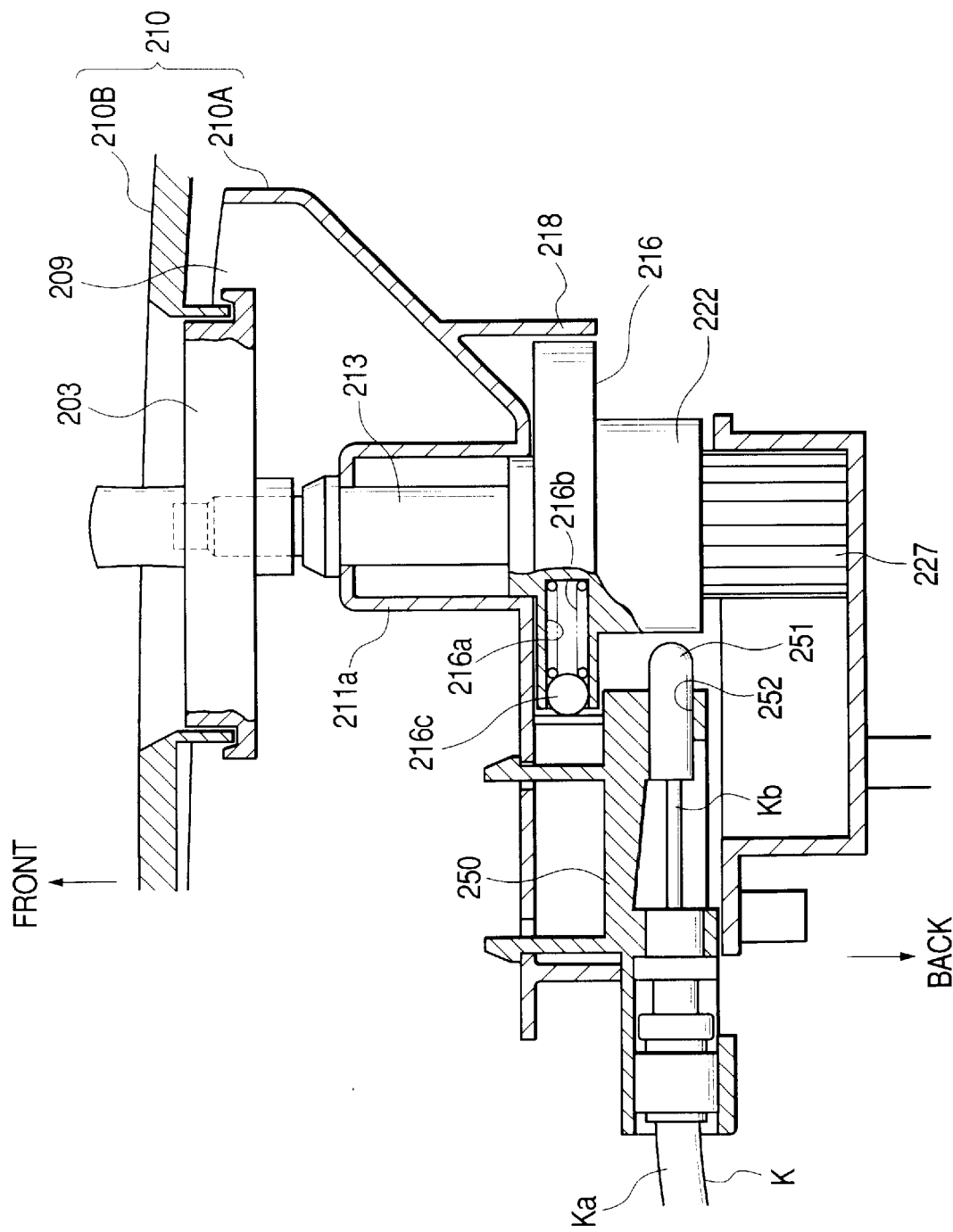
FIG. 5 is a main portion sectional view of the second controller.

A housing case 210 of the second controller 200 comprises a bottomed box-shaped case body 210A made of synthetic resin, and a flat plate-shaped operation panel 210B attached to the case body 210A so as to cover a front opening 209 of the case body 210A as shown FIGS. 3 and 5. In a bottom wall (back wall) of the case body 210A, three shaft inserted sleeves 211a to 211c are provided so as to arrange in the lateral direction. In FIGS. 3 and 4, the shaft inserted sleeves 211a and 211c on the left and right sides except the center are formed cylindrically, and the sleeves 211a and 211c have the same inner diameter and the same outer diameter. In the respective shaft inserted sleeves 211a to 211c, shafts 213 to 215 are rotatably inserted from the opposite side of the operation surface, and first to third knobs 203 to 205 are integrally fitted to protruding ends (front ends) of the shafts protruding from the operation surface side to the outside.

In this embodiment, the first operation knob 203 is an operation knob for switching blow-off of conditioning air, the second operation knob 204 is an operation knob for switching the amount of wind, and the third operation knob 205 is an operation knob for controlling temperature.

As shown in FIG. 3, on the operation panel 210B, at the periphery of an opening corresponding to the first operation knob 203, plural marks M1 to M5 that show blow-off positions of wind are denoted. Any of modes shown by the marks M1 to M3 is an undefrosting mode in which anti-fog control is not performed, and they show respectively a [face] mode in which the wind blows onto faces of a driver and the like, a [bi-level] mode in which the wind blows onto a foot and a face, and a ]foot] mode in which the wind blows onto a foot.

Any of modes shown by the marks M4 and M5 is a defrosting mode in which anti-fog control is performed, and they show respectively a [foot/def.] mode for performing anti-fog control on windows of a front glass and the like and blow-off of wind onto a foot, and a [def.] mode for performing anti-fog control on windows of a front glass and the like.

On the operation panel 210B, at the periphery of an opening corresponding to the second operation knob 204, plural marks (OFF, LO, HI) that show the blow-off amount of the wind are denoted.

On the operation panel 210B, at the periphery of an opening corresponding to the third operation knob 205, marks R1 to R3 that show temperature regions of the conditioning air (low temperature region, middle temperature region, high temperature region) are denoted.

As shown in FIG. 2, on the outer surface of the back wall (bottom wall) of the case body 210A, a partition wall 208 is provided projectingly, and a circuit substrate 207 is secured to the partition wall 208. The rear end of the shaft 214 of the second operation knob 204 is rotatably supported by the circuit substrate 207. When the second operation knob 204 is operated and turned so as to match with any one of the plural marks (OFF, LO, HI) that show the blow-off amount of wind, a switch provided for the circuit substrate 207 is turned on, so that a signal (electric current) produced at this time is output to a not-shown actuator (fan motor).

Figure 8:
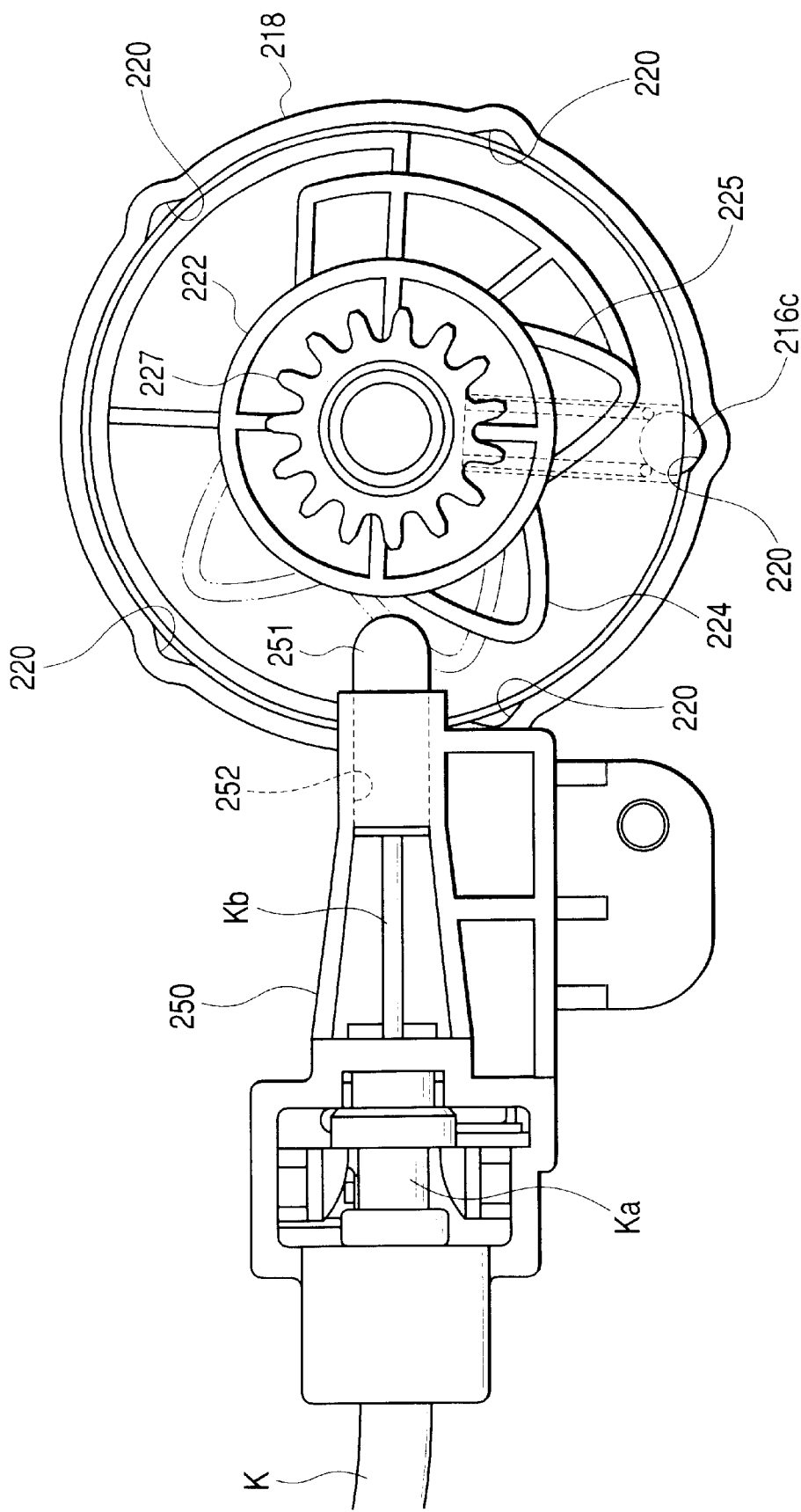
FIG. 8 is a main portion rear view showing the opposite positional relation between a cam and a cable.

Moderation holes 216a, 217a (refer to FIG. 2) are provided to diameter-enlarged shaft portions 216, 217 in the middle of the shafts 213 and 215, respectively. A coil spring 216b and a fitting ball 216 (shown only regarding the shaft 213) are inserted into the moderation holes, respectively. As shown in FIGS. 2 and 5, on the back wall outer surface (opposite side of the operation surface) of the housing case 210, cylindrical portions 218, 219 that surround the diameter-enlarged shaft portions 216, 217 are formed. As shown in FIGS. 2 and 8, at the inner surroundings of the cylindrical portions 218, 219, plural moderation grooves 220, 221 in which the moderation ball 216c and the like fit are formed at the predetermined angle spacing. The moderation grooves 220 are arranged so as to correspond to the plural marks M1 to M5 denoted on the operation panel 210B. The moderation grooves 221 are arranged so that the plural grooves are located respectively in the marks R1 to R3 showing the temperature regions of the conditioning air (low temperature region, middle temperature region, high temperature region).

In the shafts 213 and 215, on the sides opposite to the protruding end sides with respect to the diameter-enlarged shaft portions 216 and 217, cylinder portions 222 and 223 having the smaller diameter than the diameter-enlarged shaft portions 216, 217 and circular sections are formed. On the outer surfaces of the cylinder portions 222 and 223, a pair of cams 224 and 225 is protruded triangularly.

In the cylinder portions 222 and 223, on the sides opposite to protruding end sides of the shafts 213 and 215, spur gears 227 and 228 are formed coaxially with the protruding ends of the shafts 213 and 215. On the opposite side of the operation surface side and under the cylindrical portions 218, 219, oscillation shaft supporting pipes 230, 231 are protruded.

Figure 6:
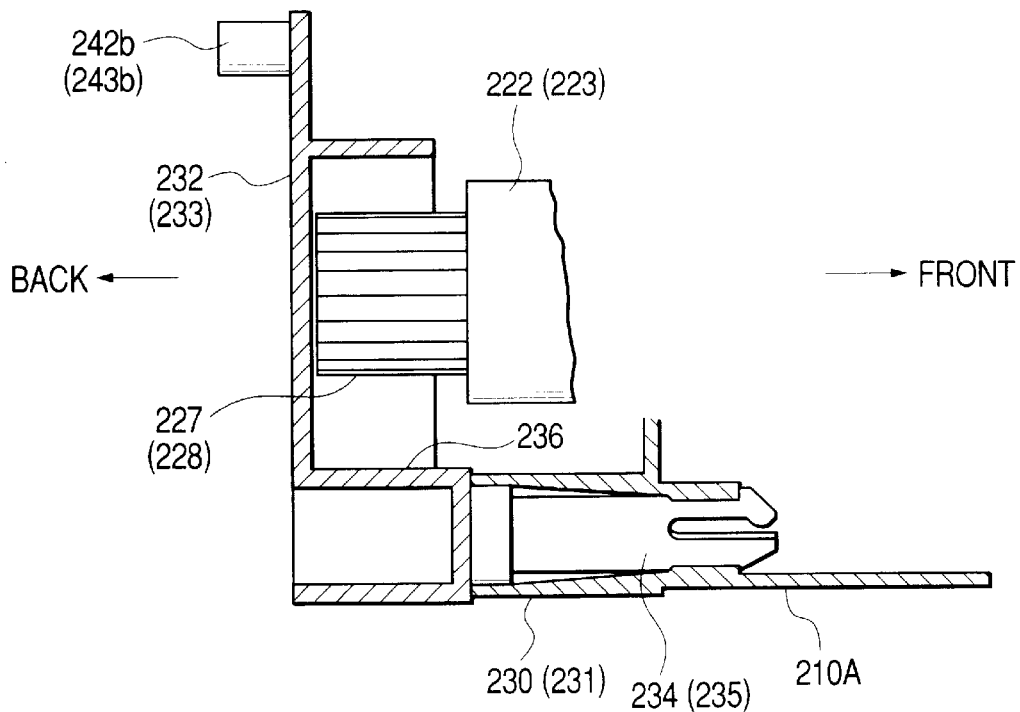
FIG. 6 is a main portion longitudinal sectional view of the second controller.

Oscillation levers 232 and 233 are provided for the oscillation shaft supporting pipes 230, 231 so that the levers can oscillate. The oscillation levers 232 and 233 are formed in the shape of a fan as shown in FIGS. 1 and 2. Oscillation shafts 234 and 235 are formed at pivot portions provided on the lower end sides of the levers. As shown in FIG. 6, the oscillation shafts 234 and 235 are inserted into the oscillation shaft supporting pipes 230 and 231 so that the shafts cannot be pulled out and can oscillate.

Figure 7:
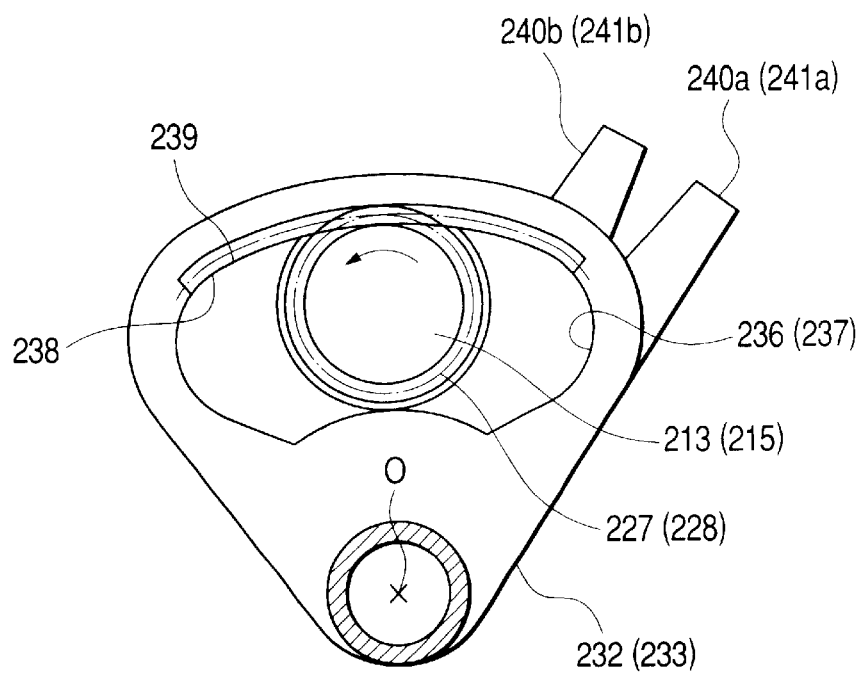
FIG. 7 is a front sectional view of an oscillation lever.

As shown in FIG. 7, fitting grooves 236, 237 recessed according to the shape of the fan are formed on the upper end front surfaces of the oscillation levers 232 and 233. In the fitting grooves 236, 237, a circular arc surface 238 is formed concentrically with the centers O of the oscillation shafts 234 and 235. A sector gear 239 engaging with the spur gear 227 (228) of the shaft 213 (215) is formed on the circular arc surface 238. The sector gear 239 is a sector inner gear in which a tip-curved surface is located inside a root-curved surface.

In the oscillation levers 232 and 233, extension parts 240a, 240b and 241a, 241b are formed so as to extend to the outside of the fan-shaped portion, and two wire coupling pins 242a, 242b and 243a, 243b that protrude backward are provided respectively to the extension parts 240a, 240b and 241a, 241b. A wire (not shown) is coupled to each of the wire coupling pins 240a, 240b, 241a and 241b, and an actuator (not shown) is coupled to the other end of the wire. A damper for switching blow-off port of conditioning air in the automotive air conditioning apparatus is connected, as an actuator, to the wires coupled to the wire coupling pins 242a and 242b. A damper for controlling temperature in the automotive air conditioning apparatus is connected, as an actuator, to the wires coupled to the wire coupling pins 243a and 243b.

The operation of the thus constituted mechanism for operating wires will be described.

In this embodiment, since the first operation knob 203 relates to the invention, the function of the first operation knob 203 will be particularly described. The third operation knob 205 operates similarly to the first operation knob 203 except that the distance between the fitting grooves 221 is different from that between the fitting grooves 220 and the actuator coupled to the wires is different. Therefore, the description of its operation is omitted.

When the shaft 213 is turned, for example, clockwise by the first operation knob 203, the spur gear 227 turns clockwise. Then, the sector gear 239 engaged with the spur gear 227, since it is the sector inner gear, turns clockwise similarly. As a result, the oscillation lever 232 supported about the oscillation shaft 234 oscillates in the right direction, and the wires (not shown) to the wire coupling pins 242a and 242b are pulled to a degree corresponding to the oscillating angle of the oscillation lever 232. Every time the shaft 213 turns at the predetermined angle, a moderation feeling in which the fitting ball 216c fits to the fitting groove 220 is provided. Corresponding to the turning angle of the first operation knob 203 giving the fitting feeling, each operating amount of the actuators (not shown) is set, whereby the damper for switching blow-off port of the conditioning air, functioned as the actuator, is suitably opened at the predetermined angle.

In this embodiment, every time the fitting ball 216c fits in the fitting groove 220, as shown in FIG. 3, a pointer 203a applied to the front surface (surface) of the first operation knob 203 corresponds to the marks M1 to M5 provided at the periphery of the opening of the first operation knob 203 on the operation panel 210B. Hereinafter, the operation positions of the first operation knob 203 in which the pointer 203a corresponds to the marks M1 to M5 are respectively referred to as a mark M1 position to a mark M5 position. The mark M1 position to the mark M3 position correspond to a mode switching operation position in the undefrosting mode, and the mark M4 position and the mark M5 position correspond to a mode switching operation position in the defrosting mode.

As shown in FIGS. 5 and 8, a cable holder 250 is attached and fixed to the rear wall outer surface of the case body 210A so as to be opposed to the cylinder portion 222 of the shaft 213. The cable K comprises an outer cable Ka and an inner cable Kb inserted into the outer cable Ka, one end of the outer cable Ka being secured to and held in the cable holder 250. One end of the inner cable Kb is protruded from one end of the outer cable Ka, and a columnar moved member 251 is fitted to its end of the inner cable.

The moved member 251 is protruded from the cable holder 250 through a guide hole 252 provided at the end of the cable holder 250 so as to be opposed to the outer surface of the cylinder portion 222, and it is arranged at a position where it can interfere with the cams 224 and 225. Namely, when the first operation knob 203 is turned from the mark M3 position to the mark M4 position, the moved member 251 is moved along the cum surface of the cam 224 from the protrusion position in FIG. 8 to there treat position, and then returned again to the protrusion position. Further, when the first operation knob 203 is turned from the mark M4 position to the mark M5 position, the cam 225 moves the moved member 251 from the protrusion position in FIG. 8 to the retreat position, and then returns it again to the protrusion position. The return operation of the moved member 251 to the original position is performed by a coil spring 129 that is provided to the first controller 100 described later and functions as are turn spring.

In case that the first operation knob 203 is located in the mark M4 position or the mark M5 position, a sensor switch 226 provided to the case body 210A is pushed on by the cam 224 or 225, that is, the defrosting mode is detected, whereby a resistant value of a temperature setting resistor provided for a control circuit (not shown) is changed and a compressor mounted on a vehicle is operated in a cooling state by the lowest temperature setting. Accordingly, by the operation of the compressor, the dehumidifying effect by the evaporator is obtained together with the defrosting action by the air flow.

First controller 100

Next, the first controller 100 will be described referring mainly to FIGS. 1, and 9 to 17.

Figure 11:
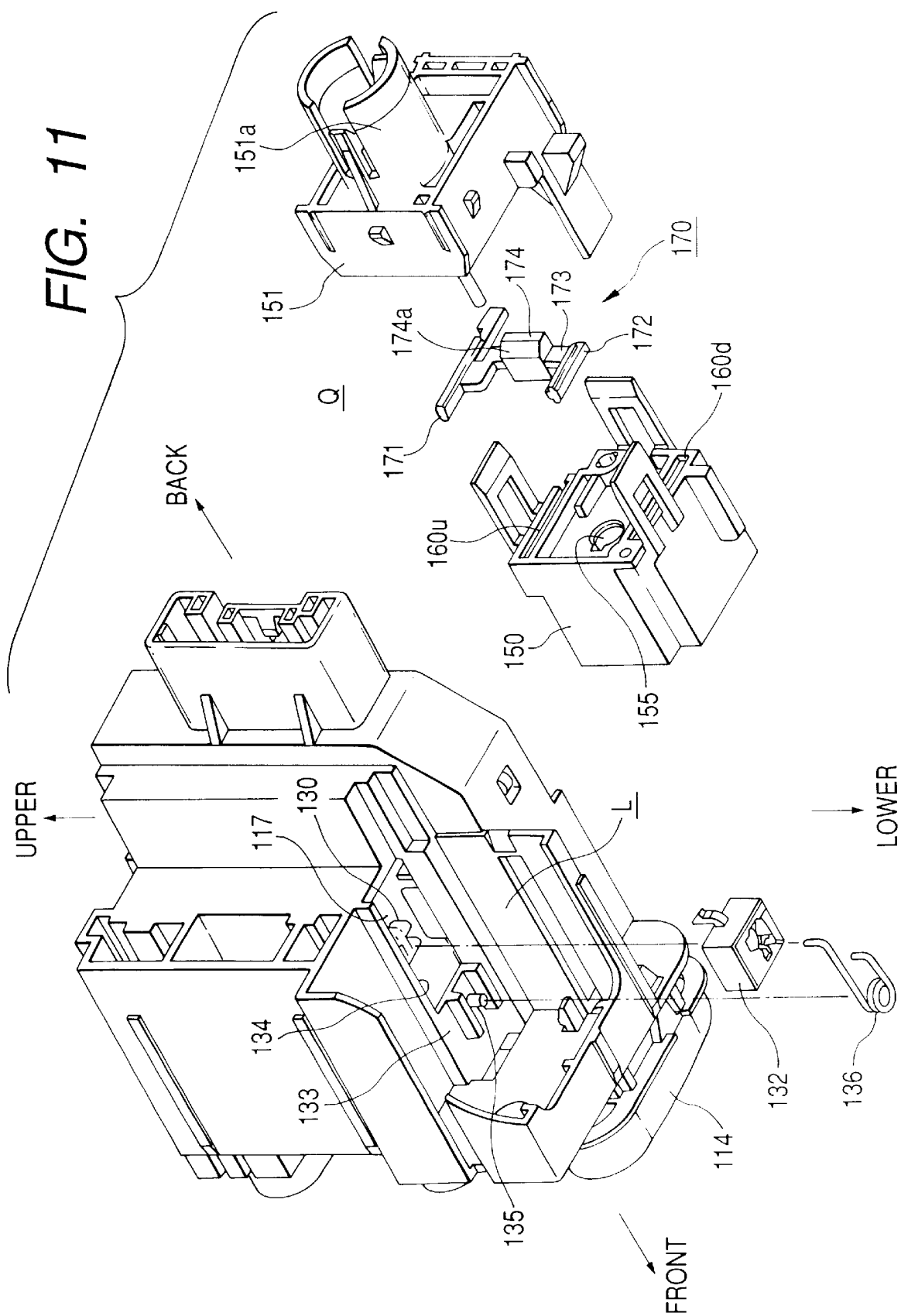
FIG. 11 is similarly an exploded perspective view of the first controller.

As shown in FIG. 10, a housing case 110 of the first controller 100 is formed nearly in the shape of a box having an opened left surface. The housing case 110 comprises a button holder housing room N, a lock release room L located at the lower portion of the button holder housing room N, and a circuit substrate housing room S adjacent to the left side of the button holder housing room N (refer to FIGS. 10 and 11). The lock release room L, as shown in FIG. 11, is provided below the housing case 110, its side wall is formed nearly rectangularly in section, and its rear portion is opened.

As shown in FIG. 10, in the housing case 110, an opening portion is formed on the side of the circuit substrate housing room S, and a substrate box 111 that stores a circuit substrate (not shown) therein is attached and fixed so as to cover its opening portion. A pair of upper and lower operation ports 112 and 113 is formed at the front wall of the housing case 110. A dummy push button 114 is attached and fixed to the lower portion of the front wall of the housing case 110. The button holder housing room N and the outside are communicated through the operation ports 112 and 113. Button holders 117 (a button holder for an operation button 115 is not shown) respectively having operation buttons 115 and 116 at their front end are inserted, through the operation ports 112 and 113, into the housing case 110 (button holder housing room N) slidably in the reciprocating direction.

Figure 9:
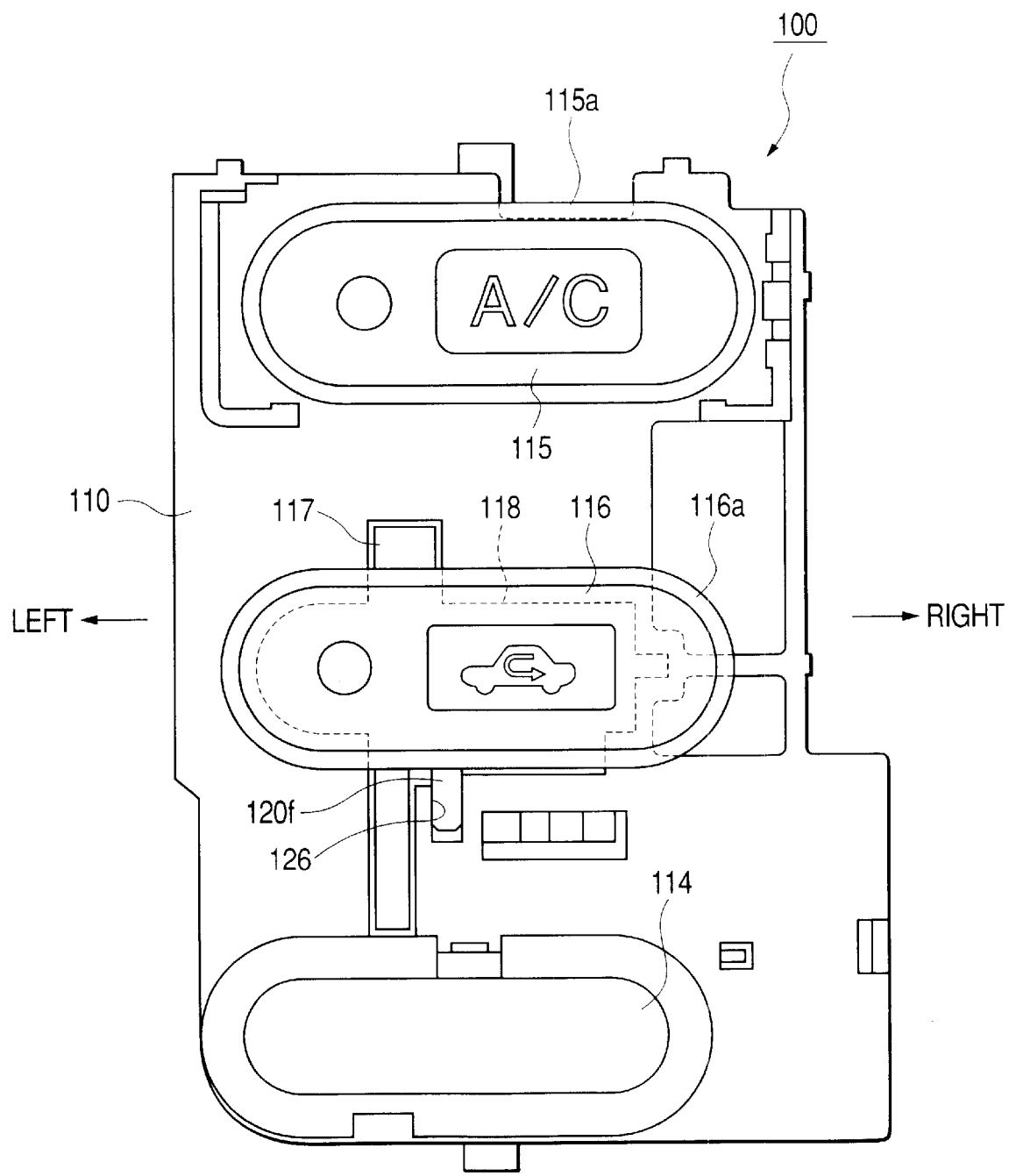
FIG. 9 is a front view of a first controller.

When the operation button 115 shown in FIG. 9 is pushed on, a switch element (not shown) provided to the circuit substrate is switched on through the not-shown button holder and the aircon is operated. The not-shown button holder is held in a press-in position by a press holding mechanism (not shown) provided in the housing case 10. This press holding mechanism is composed of a known mechanism, in which holding is released when the button holder is pressed in again, and the button holder is returned by a not shown return spring.

When the operation button 116 is pushed on, a switch element (not shown) provided to the circuit substrate is switched on through the button holder 117, and an actuator (motor) that operates the damper for switching the inside and outside air is operated thereby to switch from the outside air intake mode to the inside air circulating mode.

Figure 12:
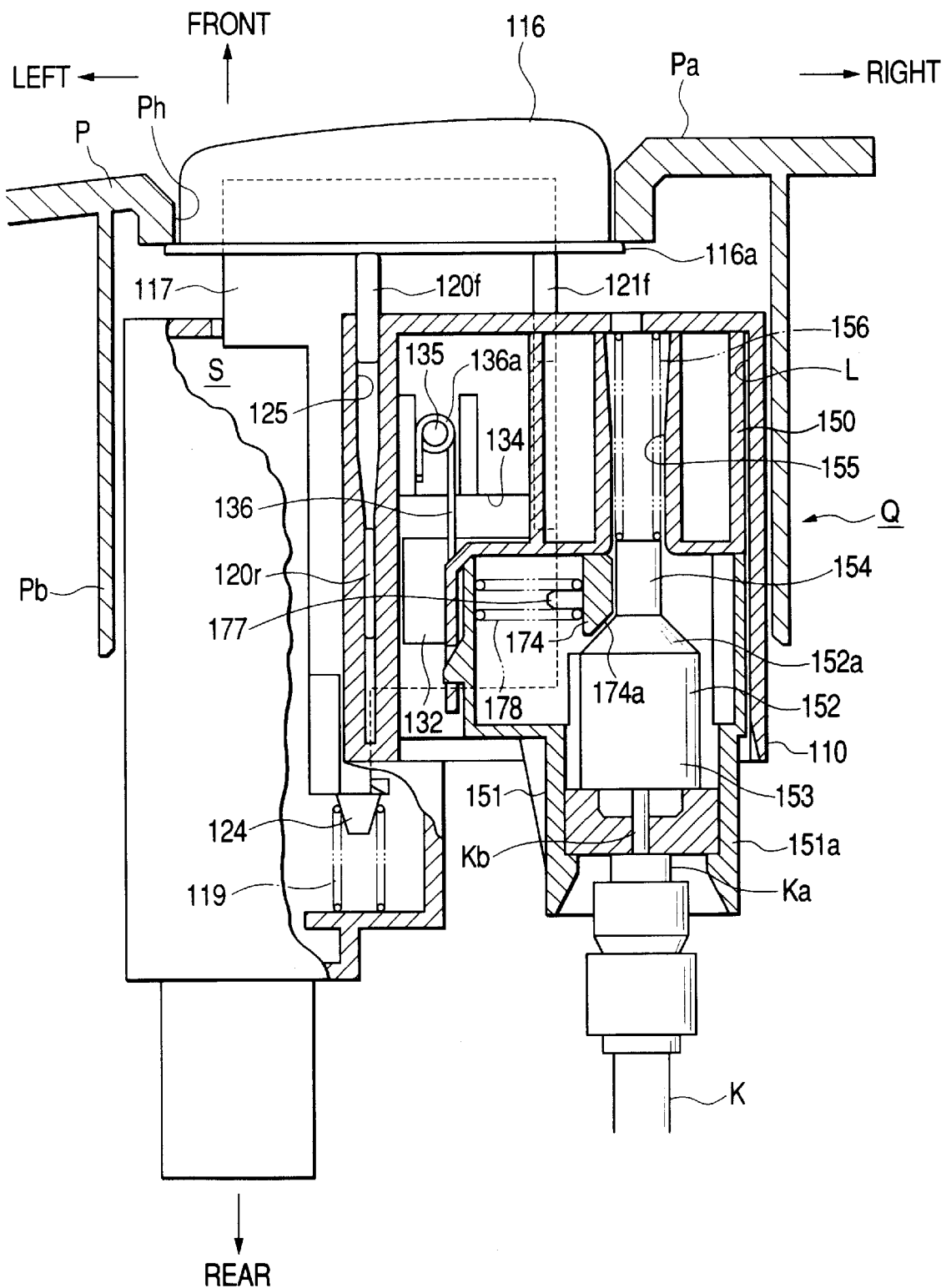
FIG. 12 is a main portion cutaway bottom sectional view of the first controller.
Figure 13:
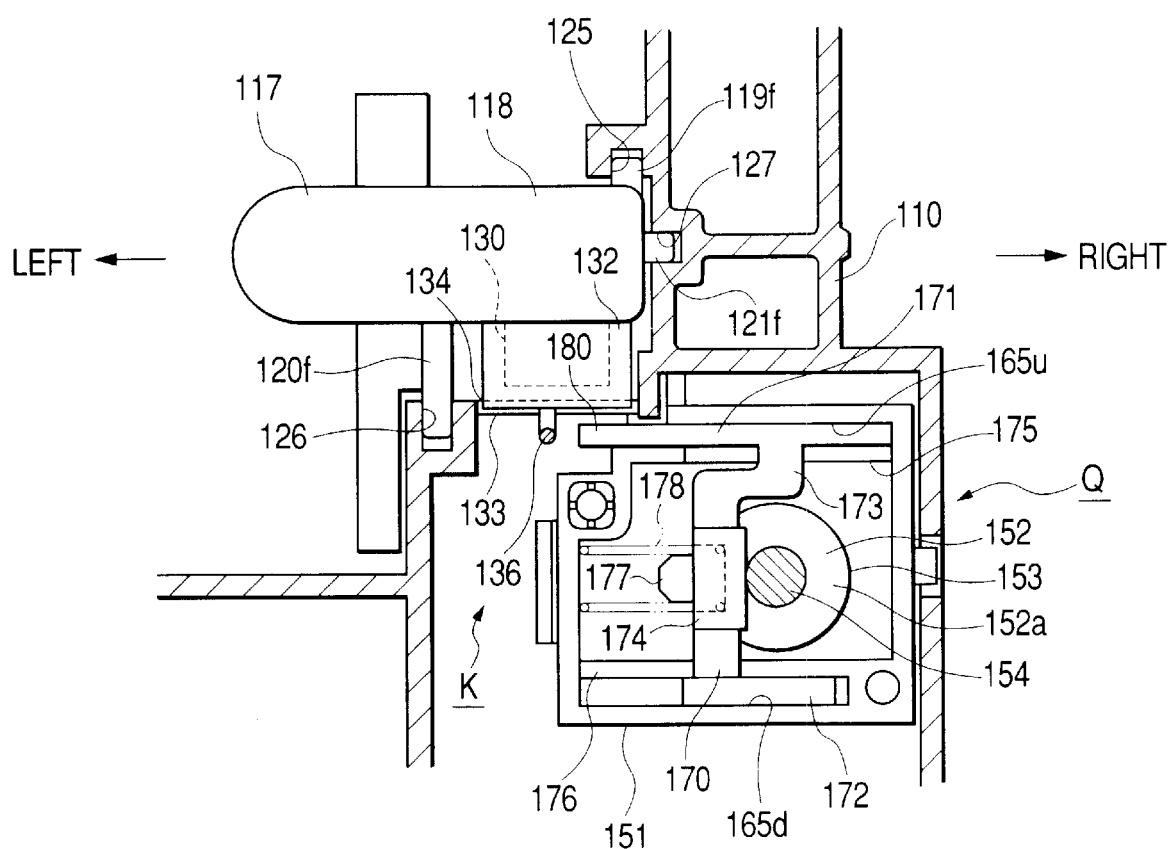
FIG. 13 is a main portion sectional view of the first controller.
Figure 16:
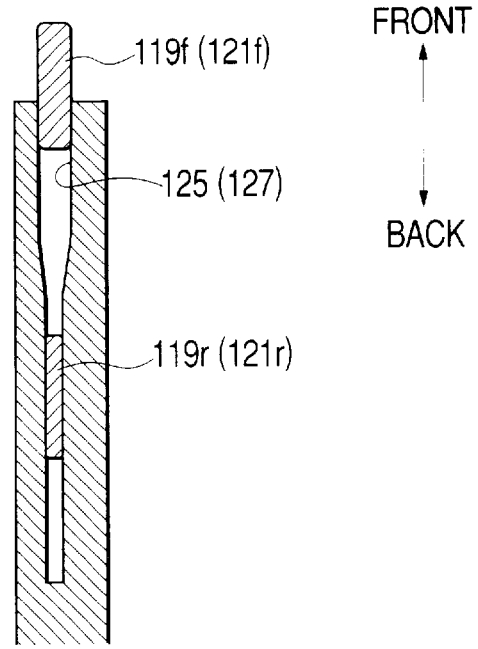
FIG. 16 is similarly a main portion sectional view of the first controller.

In the button holder 117, pairs of front and rear guide projections 119f and 119r, 120f and 120r, and 121f and 121r are arranged so as to be in a line respectively on the upper and lower surfaces and on the right surface of a flat plate portion 118 (refer to FIGS. 12, 13 and 16). Guide grooves 125 to 127 extending back and forth are formed on the wall surface in the housing case 110 so as to correspond to the guide projections 119, 119r, 120f, 120r, 121f, and 121r. The guide projections 119, 119r, 120f, 120r, 121f, and 121r are respectively fitted slidably into the respective guide grooves 125 to 127, respectively.

When the button holder 117 is pressed back and forth, the guide projections 119, 119r, 120f, 120r, 121f, and 121r are moved while being guided by the guide grooves 125 to 127 and moved.

As shown in FIG. 12, a coil spring 119, of which one end is fitted to a spring fitting projection 124 provided at the rear end of the button holder 117, and of which the other end is fixed to the rear wall of the housing case 110, energizes the button holder 117 forward.

As shown in FIGS. 11 and 13, a fitting projection 130 is provided on the lower surface of the flat plate portion 118 of the button holder 117. A nearly square box-shaped cam member 132 is fixed to the fitting projection 130 so as to cover the projection 130.

On the other hand, a partition wall 133 which is close to the flat plate portion 118 and extends in the left and right directions is provided to the housing case 110. In the partition wall 133, at the portion opposed to the cam member 132, an opening portion 134 is formed. The opening portion 134, as shown in FIGS. 15A and 15B, extends back and forth corresponding to the moving trace on which the cam member 132 moves with the back and forth movement of the button holder 117. On the lower surface of the partition wall 133 close to the front end of the opening portion 134, a spring fitting projection 135 is protruded. A lock member 136 composed of spring wire rod is wound and attached onto the spring fitting projection 135.

The cam member 132 and the lock member 136 constitute the holding mechanism H.

The holding mechanism H will be described below in detail.

Figure 17:
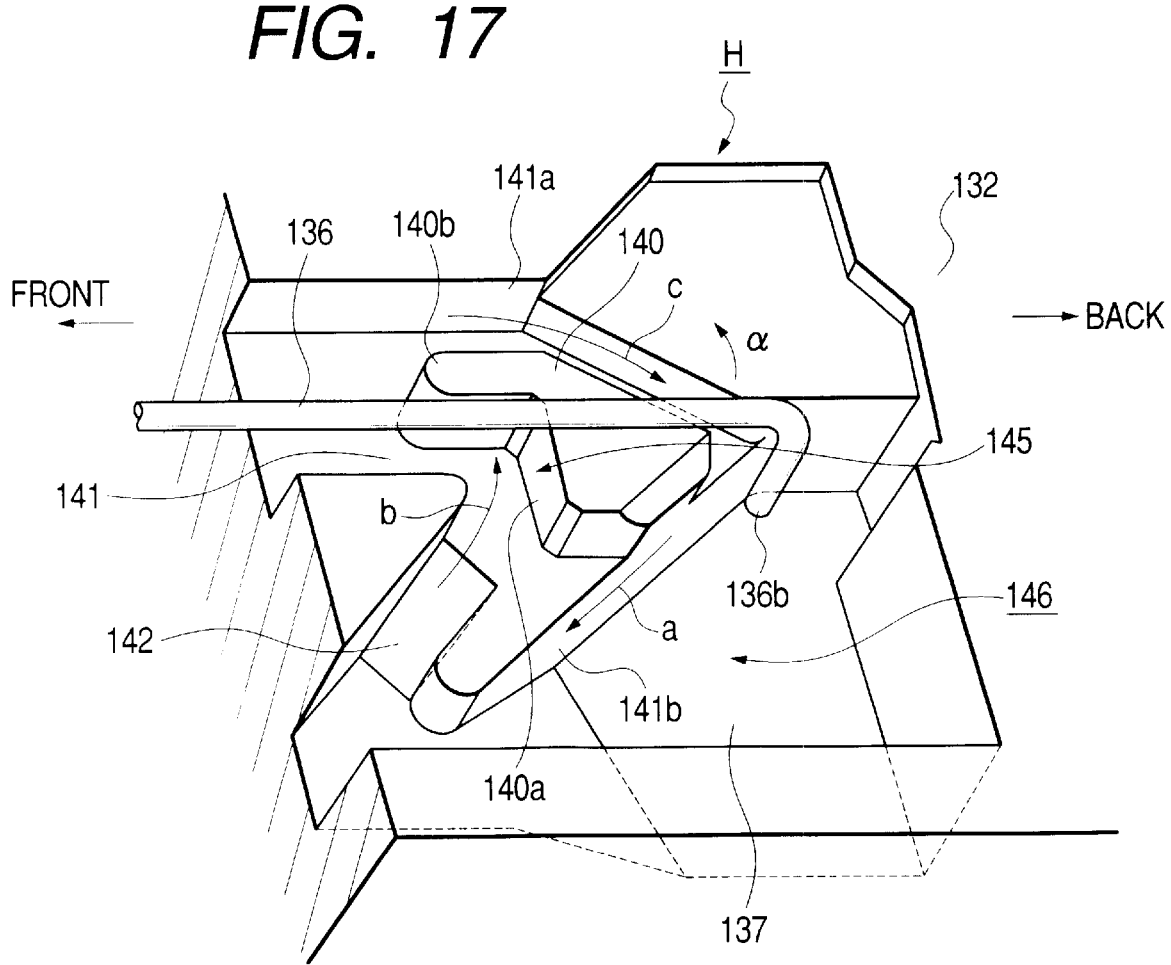
FIG. 17 is a main portion enlarged perspective view of the first controller.

As shown in FIG. 17, a recess step portion 137 is provided on the lower surface of the cam member 132. A cam protrusion 140 is protruded nearly in the center of its portion 137. The cam protrusion 140 is formed nearly in the shape of a heart, and a surface 141 close to a fitting surface 140a of the cam protrusion 140 is shallower than the recess step portion 137 and connected to the recess step portion 137 through a slant surface 142.

The recess step portion 137, the surface 141, the slant surface 142 and a surface connecting them constitute a cam groove 146.

On the other hand, as shown in FIG. 15, in the lock member 136, the coil portion 136a is fitted to the spring fitting projecting 135, and one winding end of the coil portion 136a is extended backward and an approximately L-shaped bending portion 136b is formed at its leading end (refer to FIG. 17). The bending portion 136b is always brought into contact with any lower surface of the cam member 132 through the opening portion 134.

In this embodiment, the bending portion 136b corresponds to a free end.

The lock member 136 of the holding mechanism H energizes always the bending portion 136b in the direction of an arrow α by its own elastic force, and the bending portion 136b always comes into elastic contact with the inner surface of the recess step portion 137 at the rear of the cam protrusion 140 (under the state where the button holder 117 is not pushed into the housing case) (refer to FIG. 17).

As this result, when the button holder 117 is pushed into the housing case by the operation button 116, the bending portion 136b of the lock member 136 slides along the surrounding side surface 141b of the surface 141 as shown by an arrow a in FIG. 17. When pushing is released, the bending portion 136b gets on the slant surface 142 as shown by an arrow b in FIG. 17 and lastly fits to the position near an extension 140b extending forward of the fitting surface 140a of the cam protrusion 140 thereby to hold the button holder 117 in the push-in position.

The extension 140b and the fitting surface 140a constitute a nearly V-shaped fitting portion 145.

Hereinafter, the relative position of the lock member 136 and the cam protrusion 140 at this time is referred to as a lock hold position. The push-in position corresponds to the mode switching operation position in the inside air-circulating mode.

When the button holder 117 is further pressed and pushed in the housing case somewhat from the push-in position under this holding state, the bending portion 136b of the lock member 136 is disengaged from the extension 140b of the cam protrusion 140 thereby to release holding of the button holder 117. Thereafter, the button holder 117 is moved forward by the coil spring 129, whereby the bending portion 136b slides along a groove portion 141a provided for the surface 141 as shown by an arrow c in FIG. 17 and returns to the original position opposed to the recess step portion 137.

The thus constituted lock member 136 repeats, every time the operation button is pushed on, the operation in which the bending portion 136b comes into contact with and fits to the fitting surface 140a thereby to hold the button holder 117 in the push-in position and the operation in which its holding is released is alternately repeated.

Next, release mechanism Q for releasing the holding of the holding mechanism H will be described.

A housing for the release mechanism Q comprises, as shown in FIG. 11, a cover body 150 and a case 151 attached and fixed to the rear portion of the cover body 150. The cover body 150 is formed in the shape of a nearly square box, and attached and fixed to the housing case 110 in the lock releasing room L. The other end of the outer cable Ka of the cable K is fixed to a cylinder portion 151a formed at the rear portion of the case 151. As shown in FIG. 12, an operation member 152 is fixed to the inner cable Kb protruding from the outer cable Ka.

The operation member 152 comprises a large-diameter portion 153 on the base end side, a small-diameter portion 154 on the leading end side, and a tapered portion 152a provided between the large-diameter portion 153 and the small-diameter portion 154. The leading end of the small-diameter portion 154 of the operation member 152 is inserted into an insertion hole 155 formed in the center of the rear surface of the cover body 150 slidably in the front and back directions. A coil spring 156 of which opposite ends respectively come into contact and fit to the sidewall of the housing case 110 and the small-diameter portion 154 is arranged in the insertion hole 155. The operation member 152 is energized backward by the coil spring 156.

As shown in FIGS. 13 and 14, in the cover body 150 and the case 151, on the upper and lower sidewall end surfaces opposed to each other, slide-contact guide grooves 160u, 160d and 165u, 165d extending in the lateral direction are formed. The left ends of the slide-contact guide grooves 160u and 165u on the upper side are opened.

A lock release member 170 is attached to the slide-contact guide grooves 160u, 160d, 165u, and 165d. The lock release member 170 includes a pair of slide legs 171 and 172, an arm for coupling the both slide legs 171 and 172, and a contact member 174 provided in the center of the arm 173.

The slide leg 171 is arranged in the slide-contact guide grooves 160u and 165u slidably in the left and right direction, while the slide leg 172 is arranged in the slide-contact guide grooves 160d and 165d slidably in the left and right direction. With respect to sidewalls defining the slide-contact guide grooves 165u and 165d shown in FIG. 13, the heights of sidewalls 175 and 176 on the sides where the arm 173 crosses are reduced by at least thickness of the arm 173, whereby the arm 173 moves smoothly in the left and right directions.

As shown in FIGS. 11 and 12, in the contact member 174, an inclined contact surface 174a is formed at a portion opposed to the tapered portion 152a of the operation member 152. On the opposite side of the operation member side of the contact member 74, a spring fitting projection 177 is formed, to which a coil spring 178 functioning as an energizing member is fitted and attached. The coil spring 178, of which one end is fixed to the end walls of the cover body 150 and the case 151 opposed to each other, always energizes the contact member 174 toward the operation member 152 side. As this result, in the inner cable Kb of the cable K, in the state where the cable end on the second controller 200 side is not pressed, the leading end surface of the contact member 174 is brought into contact with the small-diameter portion 154 of the operation member 152 as shown in FIG. 12. In the inner cable Kb of the cable K, in the state where the cable end on the second controller 200 side is pressed, the contact surface 174a of the contact member 174 is pressed by the tapered portion 152a and large-diameter portion 153 of the operation member 152 thereby to moves to the left.

In the slide leg 171, its end facing on the opening side of the slide-contact guide groove 165u is extended to the left, and functions as a lock release portion 180 protruded from the cover body 150 and the case 151. The lock release portion 180 can move between a non-lock release position shown in FIG. 14A and a lock release position shown in FIG. 14B.

The non-lock release position is a position when the leading end surface of the contact member 174 is brought into contact with the small-diameter portion 154 of the operation member 152 as shown in FIG. 12, and where the lock release member 170 does not come into contact with the lock member 136 as shown by a solid line in FIG. 15B. The lock release position is a position where the lock release member 170 is pressed by the large-diameter portion 153 and moved to the left, and the lock release portion 180 comes into contact with the lock member 136 located in the lock holding position and releases the lock holding state.

Reference character P shown in FIGS. 1 and 12 is an attaching case having a design plate Pa and a cover Pb formed on the rear surface of the design plate Pa, and the housing case is fitted and fixed into the cover Pb.

In the design plate Pa, as shown in FIG. 12, plural through-holes Ph are formed corresponding to the operation buttons 115 and 116, and the dummy button 114 (only the through-hole corresponding to the operation button 116 is shown); and the operation surfaces of the operation buttons 115, 116 and the dummy button 114 are protruded from the design plate Pa. At the periphery on the base end sides of the operation buttons 115 and 116, fitting flanges 115a and 116a are formed, and the forward movements of the operation buttons 115 and 116 are prevented by fitting the fitting flanges 115a and 116a to the periphery of the through-holes ph in the design plate Pa. Namely, the operation button 115, in the state where it is not pushed on, is fitted to the periphery of the through-hole Ph by the energizing force of a return spring (not shown) for energizing the button holder forward.

The operation button 116, in the state where it is not pushed on, is similarly fitted to the periphery of the through-hole Ph by the coil spring 129 functioning as a return spring for energizing the button holder 117 forward.

The position where the operation button 116 is fitted to the periphery of the through-hole Ph corresponds to the mode switching operation position in the intake mode (outside air intake mode) and also corresponds to the original position.

Action of Embodiment

Next, the action of the thus constructed controller unit U will be described.

For convenience of description, the state where the operation button 116 of the first controller 100 is not pushed on will be firstly described. Accordingly, as shown in FIGS. 15A and 17, the bending portion 136b of the lock member 136 comes into elastic contact with the inner surface of the recess step portion 137 at the rear of the cam protrusion 140.

When the operation button 116 of the first controller 100 is pushed on against the energizing force of the coil spring 129, the switch element (not shown) provided for the circuit substrate is switched on through the button holder 117, so that the actuator (motor) that operates the damper for switching the inside and outside air is operated thereby to switch from the outside air intake mode to the inside air circulating mode.

The guide projections 119f, 119r, 120f, 120r, 121f, and 121r are guided by the guide grooves 125 to 127, whereby the pressed button holder 117 moves backward. Then, the bending portion 136b of the lock member 136 located in the position shown in FIG. 15A slides along the surrounding side surface 141b of the surface 141 as shown by the arrow a in FIG. 17. When push-in of the operation button 116 is released, the bending portion 136b gets on the slant surface 142 as shown by the arrow b in FIG. 17 and lastly fits to the position near the extension 140b extending forward of the fitting surface 140a of the cam protrusion 140 thereby to hold the button holder 117 in the push-in position. At this time, the lock member 136 is located in the lock holding position for the cam protrusion 140.

When the button holder 117 is pushed in the housing case somewhat from the state where the button holder 117 is located in the push-in position (under the holding state) through the operation button 116, the bending portion 136b of the lock member 136 is disengaged from the extension 140b of the cam protrusion 140 thereby to release holding of the button holder 117. Thereafter, the button holder 117 is moved forward by the coil spring 129, whereby the bending portion 136b slides along the groove portion 141a provided for the surface 141 as shown by the arrow c in FIG. 17 and returns to the original position opposed to the recess step portion 137.

Under this return state, the switch element (not shown) provided for the circuit substrate is turned off through the button holder 117, so that the actuator (motor) that operates the damper for switching the inside and outside air is operated thereby to switch from the inside air circulating mode to the outside air intake mode.

Under the state where the button holder 117 is located in the push-in position (under the holding state), the first operation knob 203 of the second controller 200 is turned clockwise from any of the mark M1 position, the mark M2 position and the mark M3 position to the mark M4 position or the mark M5 position.

Then, the sector gear 239 engaging with the spur gear 227 similarly turns clockwise.

At this result, the oscillation lever 232 supported by the oscillation shaft 234 oscillates to the right, and the wire (not shown) coupled to the wire coupling pins 242a and 242b is pulled to a degree corresponding to the oscillating angle of the oscillating lever 232. According to the turning angle of the first operation knob 203, the damper (not shown) for switching the blow-off port of conditioning air, functioning as the actuator, is opened.

When this first operation knob 203 is turned from the mark M3 position to the mark M4 position, the cam 224 is integrally turned in the same direction. When the moved member 251 is opposed to the top of the cam 224, it operates from the protruding position shown in FIG. 8 to the retreat position. On the other hand, when the first operation knob 203 is turned from the mark M4 position to the mark M5 position, the cam 225 operates the moved member 251 from the protruding position shown in FIG. 8 to the retreat position.

According to the retreat operation of this moved member 251, the operation member 152 attached to the inner cable Kb on the first controller 100 side moves forward against the energizing force of the coil spring 156. Therefore, the contact member 174 is pressed at the contact surface 174a by the tapered portion 152a of the operation member 152 and the large-diameter portion 153 thereby to move to the left against the energizing force of the coil spring 178.

As a result, the lock release portion 180 is moved from the non-lock release position shown by a solid line in FIG. 15B to the lock release position shown by a two-dot chain line in FIG. 15B, that is, the lock release portion comes into contact with the lock member 136 located in the lock holding position, and moves the leading end of the lock member 136 to the left thereby to release the lock holding state.

Namely, the bending portion 136b of the lock member 136 moves to the left from the state where it comes into contact and fit to the fitting surface 140a and separates from the fitting surface 140a. Therefore, the button holder 117 moves forward by the energizing force of the coil spring 129, and returns to the position before the operation button 116 is pushed on, that is, the position where the operation button 116 fits to the surrounding edge of the through-hole Ph.

On the other hand, when the moved member 251 on the second controller 200 side gets on the tops of the turning cams 224 and 225, the inner cable Kb is pressed through the operation member 152 by the energizing force of the coil spring 156 on the first controller 100 side, and the moved member 251 returns to the protruding position again.

Figure 14A:
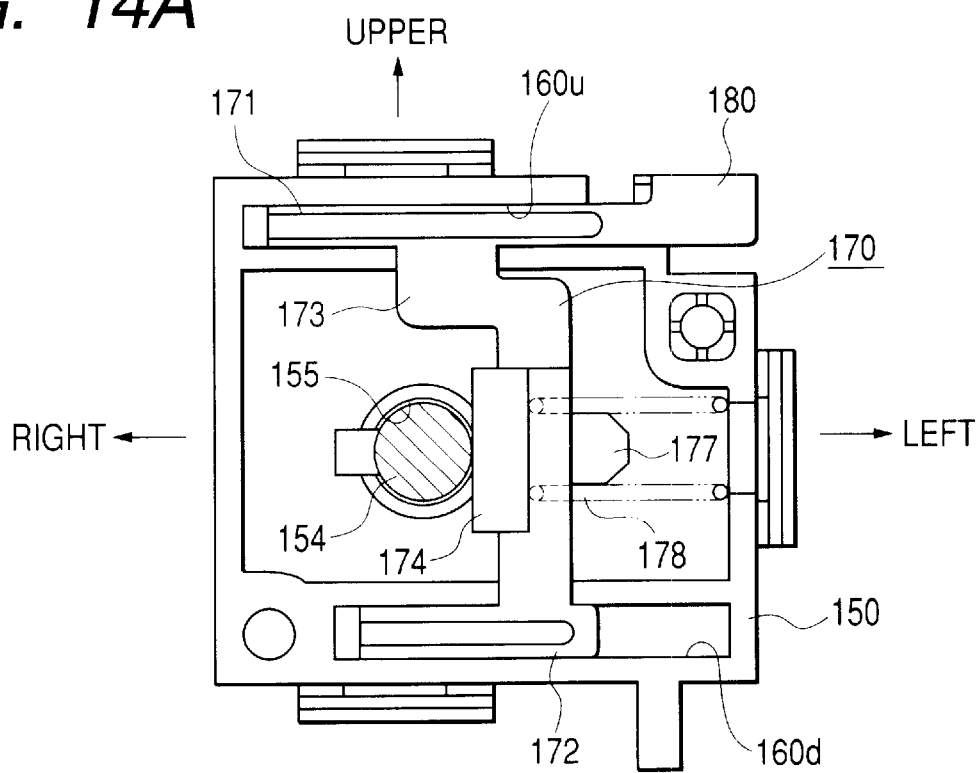
FIGS. 14A and 14B are similarly main portion sectional views of the first controller.
Figure 14B:
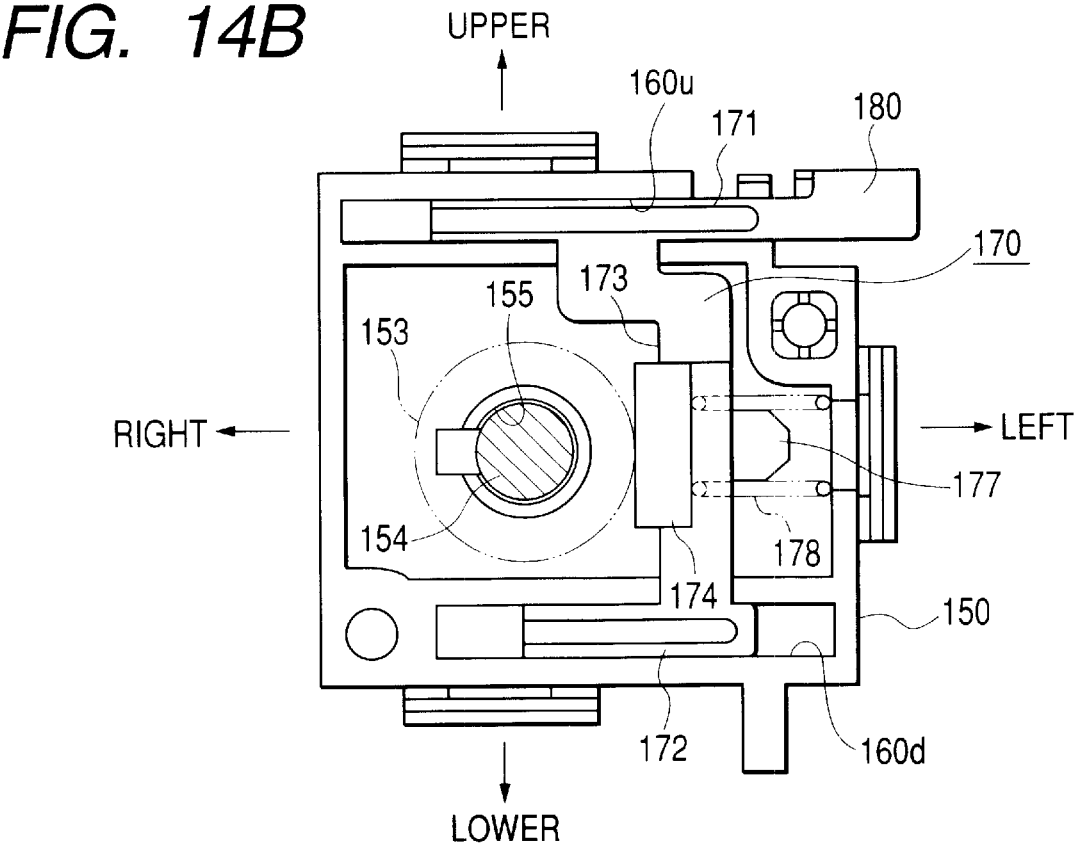

When the small-diameter portion 154 is opposed to the contact member 174 by the backward movement of the operation member 152, the lock release member 170 returns from the lock release position shown by the two-dot chain lines in FIGS. 14B and 15B to the non-lock release position shown in FIGS. 14A and 15A.

Accordingly, in this embodiment, the following effect can be obtained.

(1) In the controller unit U of the automotive air conditioning apparatus according to this embodiment, there are provided the first controller 100 which has the operation button 116 and the button holder 117 (first switching operation means) that are provided movably between the different mode switching operation positions in order to switch and operate the outside air intake mode (intake mode for taking the outside air in) and the inside air circulating mode for circulating the inside air, and the second controller 200 having the first operation knob 203 and the shaft 213 (second switching operation means) that are provided in order to switch and operate the plural air conditioning modes.

The cable K is provided between the first controller 100 and the second controller 200, which changes, when switching between the undefrosting mode and the defrosting mode by the first operation knob 203 and the shaft 213 is performed, the mode switching operation position of the operation button 116 and button holder 117 according to the above switching operation.

As a result, the second controller 200 and the first controller 100 can be spaced through the cable K. This spaced arrangement can be performed by easier constitution than the constitution in which another mechanism such as a link is coupled between the both controllers 100 and 200.

(2) In this embodiment, the cable K, when switching from the undefrosting mode to the defrosting mode is performed by the first operation knob 203 and the shaft 213, changes the position of the operation button 116 and button holder 117 from the mode switching operation position in the inside air circulating mode to the mode switching operation position in the outside air intake mode.

As a result, in the controller unit U including the apparatus in which switching by the first operation knob 203 and the shaft 213 between the undefrosting mode and the defrosting mode is performed, the above effect (1) can be realized.

The embodiment of the invention is not limited to the above embodiment but it may be changed, for example, as follows.

In the above embodiment, the first operation knob is a turning dial type but maybe a push button switch type. Namely, plural push buttons are provided corresponding to a "face" mode, a "bi-level" mode, a "foot" mode, a "foot/def." mode, and a "def." mode, and the inner cable Kb of the cable K is operated according to the operation of the push buttons for "foot/def." mode that is the defrosting mode and for "def." mode.

In the above embodiment, the first operation knob is a turning dial type but may be an operation lever type.

In this case, the operation lever is arranged so that it can move among the operation positions corresponding to a "face" mode, a "bi-level" mode, a "foot" mode, a "foot/def." mode, and a "def." mode, and the inner cable Kb of the cable K is operated when the operation lever corresponds to the operation position in the "foot/def." mode that is the defrosting mode or the operation position in the "def." mode.

In the above embodiment, the first controller 100 includes the operation button 115 and the like for operating the ON/OFF switch of the aircon. However, they may be omitted to constitute the first controller 100. Also in this case, the similar effect to that in the above embodiment can be obtained.

In the above embodiment, the second controller 200 includes the second operation knob 204 and the like. However, they may be omitted to constitute the second controller 200.

In the above embodiment, the second controller 200 includes the third operation knob 205 and the like. However, they may be omitted to constitute the second controller 200.

As described above, according to the invention, the second controller and the first controller can be spaced through the cable. As this result, the sensor switch for switching between the outside air intake mode and the inside air circulating mode, the electric circuit, and the like are not required, so that the cost can be reduced. Further, the spaced arrangement of the both controllers can be performed by easier constitution than another mechanism such as a link, so that the free degree of the layout of the both controllers can be heightened.

What is claimed is:

1. A controller unit of an automotive air conditioning apparatus comprising:

a first controller including a first switching operation unit provided movably between different mode switching operation positions to perform a switching operation between an intake mode for taking outside air in and an inside air circulating mode for circulating inside air;

a second controller including a second switching operation unit for performing a switching operation among at least two different air conditioning modes that are different from the modes in the first controller; and a cable which is coupled between the first controller and the second controller, and changes, when the air conditioning mode of the second controller is switched to the predetermined mode by the second switching operation unit, the mode switching operation position of the first switching operation unit according to the switching operation by the second switching operation unit.

2. The controller unit according to claim 1, wherein the cable, when the second switching operation unit switches the air conditioning mode to the predetermined mode, changes the position of the first switching operation unit from the mode switching operation position in the inside air circulating mode to a mode switching operation position in the outside air intake mode.

3. The controller unit according to claim 1, wherein the second switching operation unit is provided movably between mode switching operation positions in a defrosting mode for performing anti-fog control and in a undefrosting mode for not performing anti-fog control, and the cable, when the second switching operation unit is operated from the mode switching operation position in the undefrosting mode to the mode switching operation position in the defrosting mode, changes the mode switching operation position of the first switching operation mode.

4. The controller unit according to claim 2, wherein the second switching operation unit is provided movably between mode switching operation positions in a defrosting mode for performing anti-fog control and in a undefrosting mode for not performing anti-fog control, and the cable, when the second switching operation unit is operated from the mode switching operation position in the undefrosting mode to the mode switching operation position in the defrosting mode, changes the mode switching operation position of the first switching operation mode.

5. A controller unit of an automotive air conditioning apparatus comprising:

a first controller including a first switching operation unit provided movably between different mode switching operation positions to perform a switching operation between an intake mode for taking outside air in and an inside air circulating mode for circulating inside air;

a second controller including a second switching operation unit for performing a switching operation among at least two different air conditioning modes that are different from the modes in the first controller;

a cable which is coupled between the first controller and the second controller, and transmits, when the air conditioning mode is switched to the predetermined mode by the second switching operation unit in the second controller, the switching operation by the second switching operation unit to the first switching operation unit;

holding mechanism provided to the first switching operation unit, which can hold the mode switching operation position in the inside air circulating mode and can change the mode each time the operation is performed; and release mechanism provided to an end of the cable on the first switching operation unit side and to the first controller, which releases, when the first switching operation unit is held in the inside air circulating mode by the holding mechanism, the holding of the holding mechanism and changes the inside air circulating mode into the intake mode.

6. The controller unit according to claim 5, wherein the holding mechanism includes:

a return spring for energizing the first switching operation unit to an original position;

a cam groove having an approximately V-shaped fitting portion, which is provided to one of the first switching operation unit and a base member in which the first switching operation unit is movably provided; and a lock member of which one end is attached to the other of the first switching operation unit and the base member, and a free end of the lock member is moved relatively along the cam groove according to movement of the first switching operation unit and fits to the fitting portion thereby to hold the mode switching operation position in the inside air circulating mode.

7. The controller unit according to claim 6, wherein the release mechanism includes a lock releasing member that releases, when the free end of the lock member is fitted to the fitting portion, its fitting of the free end by the operation of the cable.

* * * * *